United States Patent [19]

Ritter

[11] Patent Number: 5,217,056
[45] Date of Patent: Jun. 8, 1993

[54] PROTECTIVE HOLDER FOR A THIN-WALLED CARD, PARTICULARLY A BANK CARD, CREDIT CARD OR THE LIKE

[76] Inventor: Gerhard Ritter, Haller Str. 21, 7100 Heilbronn, Fed. Rep. of Germany

[21] Appl. No.: 736,077

[22] Filed: Jul. 26, 1991

[30] Foreign Application Priority Data

Mar. 30, 1991 [DE] Fed. Rep. of Germany ... 9103928[U]

[51] Int. Cl.⁵ .................. A45C 11/18; B42F 7/00; G11B 23/04
[52] U.S. Cl. .................................. 150/147; 206/39
[58] Field of Search .............. 150/147, 145; 206/37, 206/39, 39.5, 39.6, 38

[56] References Cited

U.S. PATENT DOCUMENTS

| | | | |
|---|---|---|---|
| 2,726,758 | 12/1955 | Brower | 206/39.6 |
| 4,141,400 | 2/1979 | Mangan | 150/147 X |
| 4,301,917 | 11/1981 | Ancell | 206/39.5 |
| 5,069,333 | 12/1991 | Chen | 150/147 X |
| 5,080,223 | 1/1992 | Mitsuyama | 150/147 X |

FOREIGN PATENT DOCUMENTS

| | | | |
|---|---|---|---|
| 251900 | 1/1988 | European Pat. Off. | 150/147 |
| 3320207 | 12/1984 | Fed. Rep. of Germany | |
| 3607779 | 10/1986 | Fed. Rep. of Germany | 206/39.6 |
| 3718259 | 12/1988 | Fed. Rep. of Germany | 150/147 |
| 5926410 | 2/1991 | Fed. Rep. of Germany | 150/147 |
| 2638619 | 5/1990 | France | 150/147 |

Primary Examiner—Sue A. Weaver
Attorney, Agent, or Firm—Michael J. Striker

[57] ABSTRACT

The protective holder for a thin-walled card, advantageously for an identification card with a magnetic strip or chip, has a front and rear piece attached to each other at three closed peripheral side edges so as to form a receiving space with an open edge for the card and a receiving opening at the open edge. A recess is provided in the open edge of the front or rear piece so that on insertion of the card, particularly the card with the magnetic strip, the card does not come into contact with the opening edge and is not scratched by it in the vicinity of the recess. A raised portion in the form of a ramp rising toward the open edge is provided in the piece having the recess in the vicinity of the open edge and the recess is provided under that raised portion so that no weakening of the holder occurs because of a decrease in the wall thickness of the front or rear piece. Clamping elements can be provided attached to the front and rear piece inside the receiving space to hold the card inserted in the holder. An inclined protruding portion can be connected to the piece not having the recess at the open edge to guide the card during insertion.

14 Claims, 2 Drawing Sheets

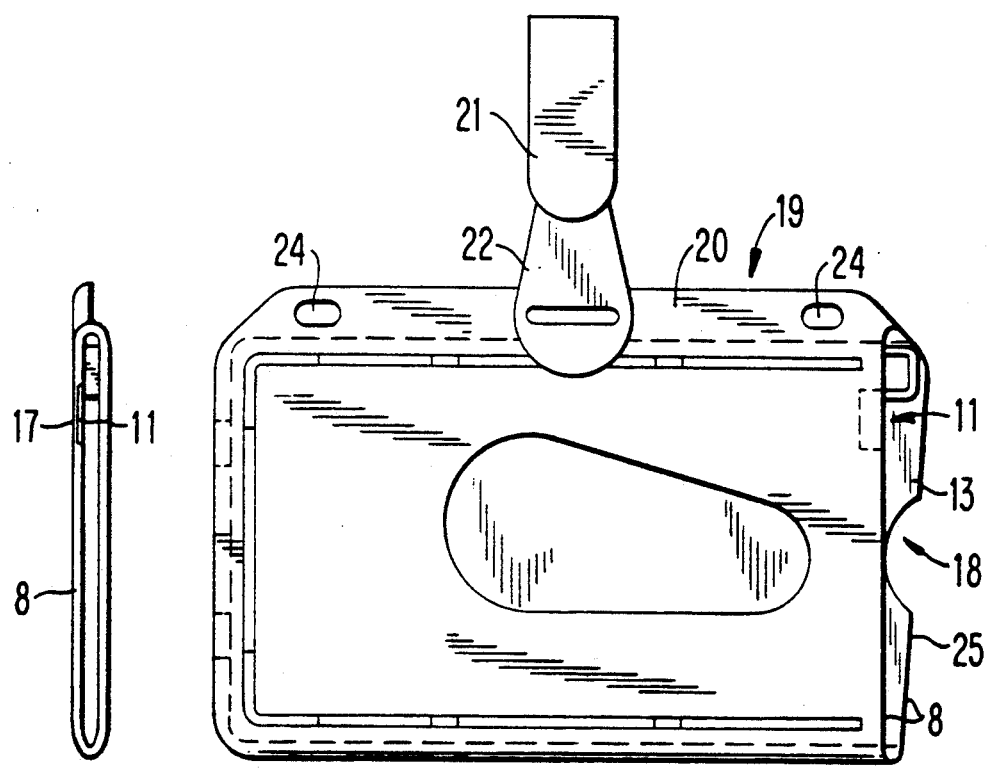

PROTECTIVE HOLDER FOR A THIN-WALLED CARD, PARTICULARLY A BANK CARD, CREDIT CARD OR THE LIKE

BACKGROUND OF THE INVENTION

The present invention relates to a holder for a thin-walled card, particularly an identification card, entry control card, bank or credit card or the like.

A known card holder of the above-described type has two side pieces attached to each other at three closed lateral edges. A fourth edge is open so as to form an opening for insertion of the card to be held in a receiving space between the side pieces.

German Patent Document DE-C 3,320,207 describes a card holder of this general type. This card holder is a flat protective shell or jacket made from an inflexible plastic material for a bank card or the like. So that this holder provides good protection for the bank card or the like held in it, the material should be as hard as possible and/or inflexible. On the other hand, it is also required that no damage occur to the card when it is inserted into the receiving space in the holder. This is particularly true of cards which are provided with a magnetic strip, which is very easily scratched by mechanical impacts during insertion. The information retained on the magnetic strip can be destroyed by scratching the strip.

SUMMARY OF THE INVENTION

It is an object of the present invention to provide a protective holder of the above-described kind for a thin-walled card, particularly a card having a magnetic strip or chip, which provides good protection for the card and is formed in the vicinity of the receiving opening so that the card is protected against mechanical damage during insertion in the holder.

This object, and others which will be made more apparent hereinafter, is attained in a holder for a card, especially an identification card with one of a magnetic strip and chip, an access control card or a bank card, comprising a front and rear piece attached to each other at three closed peripheral side edges so as to form a receiving space for the card. The holder has a fourth open peripheral side edge having a receiving opening for insertion of the card in the receiving space and the receiving opening has an open edge.

According to the invention, one of the front piece and the rear piece is provided with a recess extending over portion of its open edge in the vicinity of the receiving opening. The recess opens into the receiving space, i.e. it is on the side of the front or rear piece facing the card when the card is inserted.

The recess provided in the vicinity of the open edge ensures that a card being inserted into the receiving opening does not come into contact with the open edge of that opening in the vicinity of the recess. This recess can be located so that a magnetic strip or chip on the card cannot come in contact with the open edge as it is inserted in the holder. Thus, if the card is not inserted straight into the receiving space, it still will not be damaged.

The recess at the open edge of the card is advantageously formed by a raised portion on one of the front and rear pieces of the holder. In this case the wall thickness of the wall in the vicinity of the recess is the same as the rest of the wall. However, the recess can also be formed in the wall by a portion of the wall that has a reduced thickness in relation to the rest of the wall.

It is particularly desirable when the recess is formed by a ramp-like portion of the wall of the front or rear piece. This ramp-like portion advantageously rises from the piece, on which it is found, toward the open edge. The ramp has the advantage that the wall of the piece in the vicinity of the ramp can have a uniform wall strength and that the ramp is oriented at an acute angle to the front and rear pieces. Furthermore it can be structured so that in this region there are no sharp edge transitions. Thus scratching on the card can be avoided in this region of the card during insertion and removal of the card from the receiving space.

A protruding portion can be provided attached to one of the front and rear pieces at the open edge as an aid during insertion of the card. On insertion of the card the card contacts the protruding portion and then can be pushed into the receiving opening without problem. During insertion in this way the card is oriented at a slight angle to the front and rear pieces so that, when this protruding portion is provided, it is particularly important to provide the recess on the piece opposite to which the protruding portion is connected so that scratches are not produced on insertion of the card in the holder.

In the vicinity of the protruding portion acting as the insertion aid, a resilient tongue element with another raised portion can be provided on the protruding element. This resilient tongue element and raised portion can secure the inserted card against unintended slipping from the holder. This card securing device allows the holder to hold very thin-walled cards with a wall thickness of less than 0.5 mm. As an additional securing device clamping elements can be provided attached to or part of the front and rear piece in the receiving space. These clamping elements are of such size that, when the card is inserted in the receiving space, the card is held by them with a certain clamping force. In this way the card is secured in the receiving space so that vibration or shaking and other movements cannot work the card out from the receiving space.

BRIEF DESCRIPTION OF THE DRAWING

The objects, features and advantages of the present invention will now be illustrated in more detail by the following detailed description, reference being made to the accompanying drawing in which:

FIG. 5 is a front view of another embodiment of the card holder according to the invention, in which the wall strength is reduced for formation to form a recess near the receiving opening, and FIG. 6 is an edge-on or side view of the holder of FIG. 5 showing the receiving opening.

DETAILED DESCRIPTION OF THE INVENTION

Figures 1, 2:
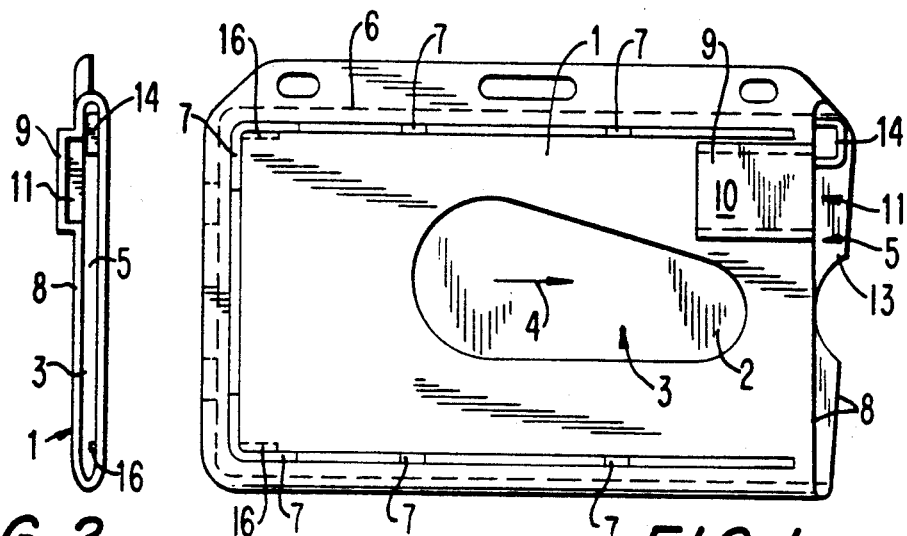
FIG. 1 is a front view of a holder for a bank card or the like according to the present invention.
FIG. 2 is an edge-on or side view of the holder of FIG. 1 including the receiving opening.

The card holder shown in FIG. 1 is useful as a protective jacket for an identification card or the like and is made from a stiff or inflexible plastic material, e.g. polycarbonate. This material is advantageously UV-stabilized. The holder is made as a single piece of plastic and has a very high mechanical stability.

The front piece 1 visible in FIG. 1 is provided with a gripping hole 2 so that the card held in the holder can be pushed out of the receiving space 3 between the front and rear pieces 1, 12 with the thumb. Several retaining openings 7 can be formed adjacent to the edge 6 of the receiving space 3, which are essential for the manufacturing process, as described in German Patent Document DE-C 3,320,207.

A ramp-like raised portion 9 is located on the front piece 1 at the open edge 8 in the vicinity of the receiving opening 5. The wall of the raised portion 9 thus forms a ramp 10, so that a recess 11 is formed extending along a portion of at the open edge 8 in this region, which is clearly detectable in FIG. 2.

A protruding portion 13 is formed as an aid to insertion of the card in the vicinity of the receiving opening 5 on the opposite rear piece 12, which forms the rear of the holder. On insertion of a bank card it can contact with its edge on the protruding portion 13 and can be then inserted gently inclined into the receiving opening 5. The card to be inserted can then be brought into a straight position as soon as a small portion of it is inserted in the receiving space 3.

Figure 3:
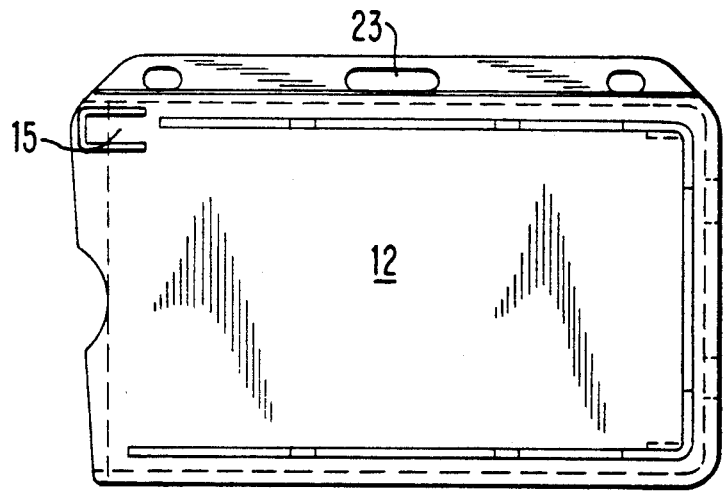
FIG. 3 is a rear view of the holder shown in FIG. 1.

Another raised portion 14 is provided on the rear piece 12 in the vicinity of the protruding portion 13, which is stamped or pressed from a resilient tongue element 15 formed on the rear piece 12 in the vicinity of the open edge 8 as seen in FIG. 3. The other raised portion 14 on the tongue element 15 acts as a card securing element, which holds the card back after it is inserted in the receiving space and guarantees that the inserted card will not slip out.

Clamping elements 16 are provided on the walls of front and rear pieces 1, 12 close to the edge 6 of the holder at the end of the receiving space 3, which hold fixed a card inserted into the receiving space in this region.

The side having the receiving opening 5 and the rear piece 12 of the holder are shown in FIGS. 2 and 3. Some of the reference numbers of FIG. 1 have been omitted from FIGS. 2 and 3 for clarity.

Figure 4A:
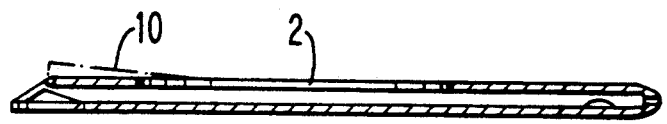
FIG. 4a is a longitudinal cross-sectional view through the holder of FIG. 1 in the vicinity of the raised portion.
Figure 4B:
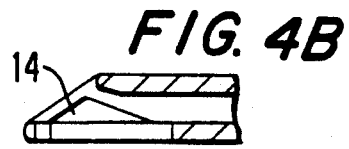
FIG. 4b is a detailed cutaway cross-sectional view of an end portion of the holder of FIG. 1 showing the raised portion.
Figure 4C:
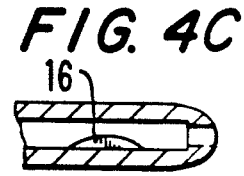
FIG. 4c is a detailed cutaway cross-sectional view of another end portion of the holder of FIG. 1 remote from the end portion shown in FIG. 4b.

The clamping elements 16 and the other raised portion 14 for securing, the card in place are shown particularly clearly in FIGS. 4A, 4B and 4C. These clamping elements 16 are advantageously located in the closed corners of the receiving space 3 as shown FIGS. 1. In FIG. 4A, 4B and 4C the shape of the ramp 10 is indicated with a dashed line.

In FIG. 5 another embodiment of the holder according to the invention is shown. Instead of the raised portion 9 and its ramp as in the previous embodiment, the holder of FIG. 5 has a recess 11 formed in the inside of the front piece 1, which is formed by reducing the thickness of the wall to form a thinner wall portion 17.

Also in this embodiment the protruding portion 13 is provided with a cutout portion 18, which makes grasping the card for withdrawal from the holder easier. In the preferred embodiment shown the center part of the cutout portion extends to the open edge 8. The protruding portion 13 can have an inclined edge 25.

An attaching strip 20, to which an attaching clip 21 with strap 22 is connected, is provided on the upper front edge 19 of the holder. The elongated hole 23 provided for the attaching clip 21 is visible in FIGS. 1 and 3. Throughgoing openings 24 are provided on the attaching strip 20 for an unshown supporting chain.

While the invention has been illustrated and described as embodied in a protective holder for a thin-walled card, such as an identification card, entry card, bank card or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A holder for a card, said holder comprising a front piece (1) and a rear piece (12) attached to each other to form three closed peripheral side edges, a fourth open edge (8), a receiving space (3) for the card and a receiving opening (5) for insertion of the card in the receiving space (3), wherein one of the front piece (1) and the rear piece (12) is provided with an outwardly extended raised portion (9) in the vicinity of the receiving opening (5), said raised portion (9) providing a recess (11) in the open edge (8) and extending over a portion of the open edge (8), the recess (11) being open toward the receiving space (5).

2. The holder as defined in claim 1, wherein the raised portion (9) is formed on the front piece (1) and located at the receiving opening (5).

3. The holder as defined in claim 2, wherein said raised portion (9) is shaped like a ramp and climbs from the front piece (1) toward the open edge (8).

4. The holder according to claim 1, further comprising a protruding portion (13) extending from the front and the rear piece (1, 12) not having the raised portion (9), in the vicinity of the receiving opening (5).

5. The holder as defined in claim 4, wherein the protruding portion (13) has an inclined free edge (25).

6. The holder as defined in claim 5, wherein the protruding portion (13) has a cutout portion (18), a center part of said cutout portion extending up to a portion of the open edge (8) on the one of the front and rear piece having the raised portion (9).

7. The holder according to claim 1, further comprising a resilient tongue element (15) formed on one of the front and rear pieces (1, 12) in the vicinity of the open edge (8), said resilient tongue element also having an additional raised portion (14) protruding toward the opposing one of the front and rear pieces (1, 12), so that said tongue element with said additional raised portion forms a retaining device for the card, when the card is held in the receiving space.

8. The holder as defined in claim 7, further comprising a protruding portion (13) extending from the one of the front and the rear pieces (1, 12) not having the raised portion (9) in the vicinity of the receiving opening and the tongue element being disposed on the same piece as the protruding portion with at least a portion of the tongue element (15) being located on the protruding portion (13).

9. The holder as defined in claim 1, further comprising an attaching strip (20) attached to one of the front and rear pieces and located in the vicinity of one of the closed peripheral side edges, said attaching strip having an opening for engagement of attachment means.

10. The holder as defined in claim 1, further comprising a plurality of clamping elements attached to one of the front and the rear pieces inside of the receiving space in the vicinity of the closed peripheral side edge opposite the receiving opening (5), said clamping elements being of such size as to clamp the card, when the card is inserted in the receiving opening.

11. The holder as defined in claim 10, wherein one of the clamping elements is located in the vicinity of each closed corner of the receiving space.

12. A holder for a card with a magnetic strip, said holder comprising a front piece (1) and a rear piece (12) attached to each other to form three closed peripheral side edges, a fourth open edge (8), a receiving space (3) for the card and a receiving opening (5) for insertion of the card in the receiving space (3), wherein one of the front piece (1) and the rear piece (12) is provided with an outwardly extended raised portion (9) in the vicinity of the receiving opening (5), said raised portion (9) providing a recess (11) in the open edge (8) and extending over a portion of the open edge (8), the recess (11) being open toward the receiving space (5) and being dimensioned and positioned to protect the magnetic strip on the card from damage when the card is inserted in the receiving opening.

13. The holder according to claim 12, further comprising a resilient tongue element (15) formed on one of the front and rear pieces (1, 12) in the vicinity of the open edge (8), said resilient tongue element also having an additional raised portion (14) protruding toward the opposing one of the front and rear pieces (1, 12), so that said tongue element with said additional raised portion forms a retaining device for the card, when the card is held in the receiving space.

14. The holder as defined in claim 13, further comprising a protruding portion (13) extending from the one of the front and the rear pieces (1, 12) not having the raised portion (9) in the vicinity of the receiving opening and the tongue element being disposed on the same piece as the protruding portion with at least a portion of the tongue element (15) being located on the protruding portion (13).

* * * * *